April 13, 1954     P. F. SHIVERS     2,675,019

LIQUID LEVEL CONTROL

Filed May 19, 1952

*INVENTOR.*
PAUL F. SHIVERS
BY
George H. Fisher
*ATTORNEY*

Patented Apr. 13, 1954

2,675,019

UNITED STATES PATENT OFFICE 2,675,019

LIQUID LEVEL CONTROL

Paul F. Shivers, Edina, Minn., assignor to Minneapolis-Honeywell Regulator Company, Minneapolis, Minn., a corporation of Delaware Application May 19, 1952, Serial No. 288,586

10 Claims. (Cl. 137—386)

This invention relates to a liquid level control and, more particularly, to an oil level control device for maintaining a constant oil level with respect to an oil burning furnace and for controlling the flow of oil thereto.

The prior art devices for maintaining a constant oil level with respect to a furnace, which are being used commercially, are of the type wherein a float is used to control a valve, to maintain a predetermined constant oil level. This type of control is satisfactory so long as the float, which is usually of the hollow ball or sheet metal chamber type, remains buoyant. However, when the float of this type springs a leak, the inlet valve controlled thereby opens and the device is flooded with oil and, unless suitable safety means is provided, the oil will flow over into the space in which the furnace is located. If an additional safety mechanism is provided, such as a second float to actuate the inlet valve to its closed position in the event of such flooding, the control device becomes quite large and expensive.

It is an object of this invention to provide a liquid level control device which is compact, inexpensive, durable, and which will "fail-safe" in the event that the power means for actuating the inlet valve fails.

Another object of the invention is to provide a control device for maintaining a constant liquid level, which makes use of the principle of heat dissipation by the oil to regulate the opening and closing of an inlet valve by a heat motor.

Still another object of the invention is to provide a liquid level control wherein an electrical current constantly passes through a bimetallic member to actuate an inlet valve and in which the actuation of the valve is controlled by the cooling of the bimetal in response to liquid level in the device.

Still another object of the invention is to provide a liquid level control device having a U-shaped bimetal valve actuator extending at an angle across the liquid level line so that slight liquid level variations will provide substantial, but not sudden, variations in the heat dissipation from the bimetallic member when electric current is constantly passing therethrough.

A still further object of the invention is to provide a liquid level and liquid flow regulator making use of a constantly heated bimetal, for controlling the liquid level valve, and a thermostatically controlled heat motor, for regulating or controlling the delivery valve of the device.

Still other objects of the invention will become apparent upon reading the following detailed description of the invention in conjunction with the accompanying drawing wherein.

Figure 1:
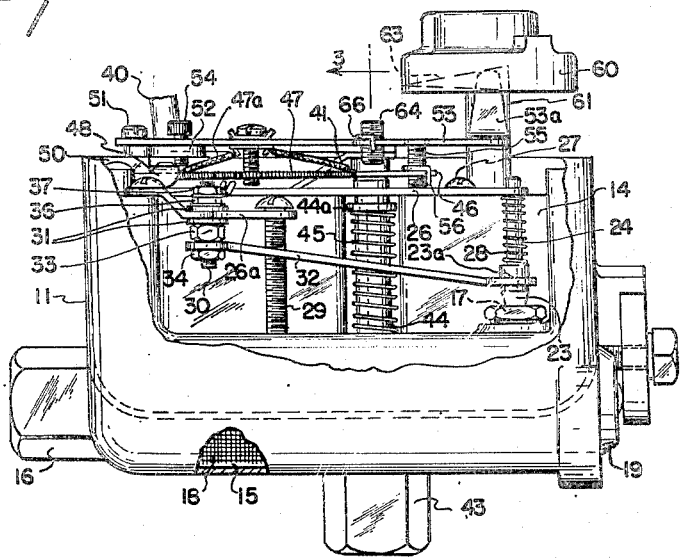
Figure 1 is a side elevation view of the liquid level control with a portion of the side wall thereof broken away.
Figure 2:
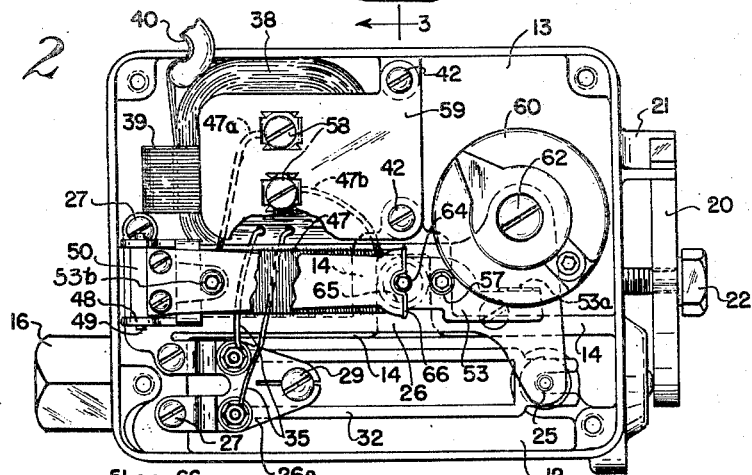
Figure 2 is a plan view with portions thereof broken away.
Figure 3:
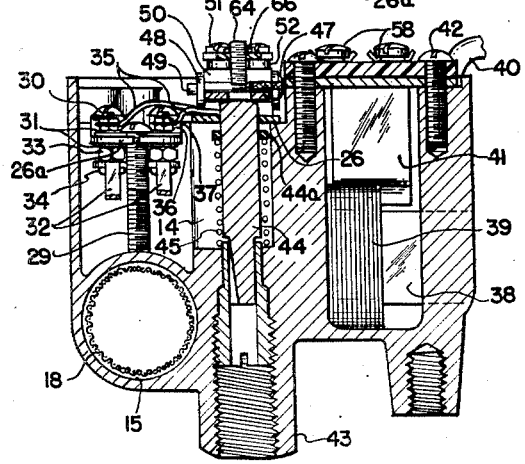
Figure 3 is a cross-sectional view of the control taken along line 3—3 of Figure 1.

The invention is illustrated as comprising a generally cup-shaped body 11 divided into two open-top chambers 12 and 13 with a dividing wall 14 therebetween. Located under the chamber 12 is a filter chamber 15 having an internally threaded inlet passage 16 and a removable valve seat 17 positioned between the chamber 15 and chamber 12. A removable filter 18, having an end plug member 19 is held in assembled relationship in the chamber 15 by means of a clamp bar 20. One end of the bar 20 rests on a notched boss 21 while the other end of the bar rests on the member 19. A bolt 22 extends through the bar 20 and is screw threaded into body 11 to clamp the bar 20 tightly against the boss 21 and plug 19 to sealingly hold the plug against the body.

Cooperating with the valve seat 17, is a valve 23, which has a stem 24 vertically slidable in a bore 25 through a mounting plate 26. The plate 26 is secured to the dividing wall 14 by means of screws 27. A compression spring 28 normally biases the valve 23 into seating relationship with the valve seat 17 to prevent the flow of oil into the chamber 12. Transversely offset and positioned below the plate 26, is an arm extension 26a. The arm 26a is adapted to be pivoted about the base of the arm, against its inherent resilience, by means of an adjusting screw 29, screw threaded through the free end of the arm 26a. The lower end of the screw 29 is swivelly mounted in a socket in the bottom of the chamber 12.

Secured to the arm 26a by means of electrical terminal bolts 30, which are insulated from the arm 26a by washers 31 of suitable insulating material, is a generally U-shaped bimetallic arm 32. The spaced ends of the open end of the bimetallic arm are rigidly secured on the bolts 30 by means of nuts 33 and 34 while the closed movable end of the arm 32 is bifurcated to fit in an annular groove (not shown) in the valve 23 for moving the valve between opened and closed positions, depending upon whether the arm 32 isn't or is, respectively, sufficiently cooled by the level of oil in the chamber 12. Leads 35, clamped between nuts 36 and 37 on each of the bolts 30 extend to the secondary coil of a transformer 38 positioned in the chamber 13. The core of the transformer 38 is shown at 39 in the drawing while the line voltage lead to the primary coil of the transformer is shown at 40. The transformer is held in its assembled position in the chamber 13 by means of a downwardly extending arm 41 engaging the top of the core of the transformer at one end thereof and secured to the wall of the body 11 and the partition wall 14 by means of bolts 42.

When the control is installed in a heating system, line voltage current will be constantly supplied to the transformer 38 which, in turn, constantly supplies lower voltage current to the U-shaped bimetallic arm 32 which is in series relationship with the secondary coil. When there is insufficient oil in the chamber 12 to dissipate the heat from the bimetal arm 32, said arm will warp in a direction to move the valve engaging end thereof upwardly to open the valve 23 against the bias of spring 28. Then, after oil has been admitted to chamber 12 to a predetermined oil level, substantially half-way up the arm 32, the heat in the arm 32 will become sufficiently dissipated to the oil, from the oil to the valve body 11, and from the body 11 to the atmosphere, to cause the arm 32 to warp in a direction to close valve 23. The valve will remain closed so long as the oil level remains at the predetermined level, which may be varied by adjusting the screw 29 to pivot the arm 26a upwardly or downwardly and thus change the relative position of the arm 32 and valve 23 with respect to the valve seat 17.

The oil is discharged from chamber 12 to a furnace through internally threaded outlet passage member 43, which is controlled by a valve 44 of conventional construction. The valve 44 is biased toward its open position by means of compression spring 45 extending between the bottom of chamber 12 and a fixed annular shoulder 44a on the valve member 44. The valve 44 is normally held in its closed or minimum flow position by means of a bimetallic arm 46 on which is mounted a heater wire 47. One end of the bimetallic arm 46 is secured to a bracket 48. The bracket, in turn, is pivoted on a pivot pin 49 in a block 50, suitably secured to the mounting plate 26. Secured to the top of the block 50 by means of screws 51, is a short rigid plate 52 and a long rigid arm 53. An adjusting screw 54 extends through a large hole 53b in the arm 53 and is screw threaded through the plate 52 and into abutting relationship with the bracket 48. The screw 54 is adjustable to cause a portion of the arm 46, near the free end thereof, to bear against the valve 44 to hold said valve either in its closed position or in its minimum flow position against the bias of spring 45. The minimum flow position of the valve is determined by an adjusting screw 55 screw threaded through the end of the bimetallic arm 46 for engagement with the top of plate 26 when the valve 44 has reached a nearly closed position providing the desired minimum flow of oil for low flame or pilot flame in the furnace. A spring friction clip 56 is provided on the arm 46 for frictionally holding the adjusting screw 55 in its adjusted position. Access is provided to the adjusting screw 55 through an opening 57 in the arm 53.

The ends of the heater coil 47 are connected by insulated leads 47a and 47b to electrical connector terminals 58 extending through a panel 59 of insulating material. The panel 59 is secured to the wall of body 11 and partition wall 14 by the same screws 42 that secures member 41 to said walls.

Energization of the heater 47 to cause opening of the valve 44 is brought about by connecting the terminals 58 to an external thermostatically controlled circuit, which responds to the temperature condition of a space which is to be heated by the above mentioned furnace.

The high flame in the furnace is regulated by limiting the opening of the valve 44 upon energization of the heater 47. This is accomplished by adjustably positioning a control knob 60 pivoted on a shaft 61 extending upwardly from the plate 26. The knob is retained on such shaft 61 by means of a screw 62 extending through a hole in the knob and screw threaded into the shaft 61 a spiral bearing surface 63 around the bottom of knob 60 is adapted to bear on an upwardly extending follower 53a on the free end of the arm 53. It is thus seen that by rotation of the knob 60, the vertical position of the free end of the arm 53 may be varied. The means for limiting the upward movement of the valve 44 by the position of the knob 60 and arm 53, consists of an adjusting screw 64 screw threaded through the arm 53 for engagement with the upper end of the valve 44, when said valve has been freed to move under the bias of spring 45, by upward movement of the arm 46. The adjusting screw 64 is adapted to pass through a hole 65 in the bimetallic arm 46 and into engagement with the valve 44. Also, the adjusting screw 64 is frictionally held in its adjusted position by means of a spring clip 66, similar to the spring clip 56.

Operation

The liquid level control device is illustrated in the drawing as being in the condition that it would be in if it were installed in a conventional heating system, with the inlet 16 connected to a source of oil, the outlet 43 connected to a pot-type of furnace, the primary lead 40 connected to a source of line voltage, and the terminals 58 connected to a room thermostat control circuit and with the room thermostat in a satisfied condition. In such a condition of the control, oil will be supplied to the furnace at a rate sufficient to maintain a pilot flame due to the fact that the valve 23 is not completely closed, the lower end of screw 55 being in engagement with the plate 26 to prevent the bimetallic arm 46 from completely closing the valve 44.

Upon a call for heat by the room thermostat closing, the bimetal arm 46 will be heated by the energized coil 47 to cause said arm to warp and move the screw 55 upwardly from the plate 26 and the end of valve 44. The spring 45 around the valve will cause said valve to follow the movement of the arm 46 and move into engagement with the lower end of screw 64 extending through the hole 65, to the maximum flow or high flame operating condition of the furnace.

In the event that the outside temperature becomes extremely low or, if for any other reason a greater amount of heat is desired from the furnace than that being provided with the existing adjustment of the control knob, clockwise rotation of the knob 60 will put a deeper portion of the spiral surface over the upper end of follower 53a so as to cause the arm 53 to move upwardly and thus allow the valve 44 to move to a more open position.

As the oil flows from chamber 12 through the outlet 43, the oil level will fall and thus reduce the contact area between the oil and the bimetallic arm 32. The smaller the area of oil contact, the smaller will be the dissipation of heat from the bimetal 32. Thus, with a fall in oil level, the bimetal 32 will heat up and move the valve 23 to its open position, where it will remain until the oil level has been reestablished. It will thus be noted that the valve 23 will do some hunting, as long as oil is being applied to the furnace, between its open and closed positions in response to the heating and cooling of the bimetal 32, to maintain a desired oil level. A point of equilibrium is usually established after two or three oscillations of the valve 23, to cause it to admit oil as fast as it is being used. By maintaining a constant oil level in the liquid level control, a uniform rate of flow of oil to the furnace will be maintained regardless of the oil level in the oil storage tanks or other oil supply source.

Failure of the electrical supply causes valve 23 to close because cooling of bimetal 32 always causes closing of the valve. This will prevent unsafe burning of fuel when other electrically operated devices of the system are not functioning. Also, flooding of the furnace is limited to the point at which no further oil can flow by gravity into the fire pot. At this point the valve closes and remains closed because any rise of the oil level in chamber 12 always causes a cooling of the bimetal 32, which closes valve 23.

As indicated above in the general description of the control, the oil level in the chamber 12 may be adjusted by adjusting the screw 29. A minimum flow of oil to the furnace for either low-fire or pilot flame conditions, may be controlled by the screw 55. If it is desired that the supply valve be completely closed, upon the room temperature becoming satisfied, the screw 55 is screwed away from the plate 26 so that bimetal arm 46 can actuate the valve 44 to its fully closed position.

While the preferred embodiment of the invention has been described above and illustrated in the drawing, it is deemed to be obvious that various modifications may be made in the design of the invention and the parts thereof without departing from the spirit of the invention. Therefore, it is contended that the scope of the invention should be determined solely from the appended claims.

I claim as my invention:

1. A constant level oil valve comprising a valve body having first and second chambers therein, an oil inlet valve in said first chamber, means biasing said valve closed, a first substantially U-shaped bimetallic member secured by electrical terminal members to an adjustable arm on said valve body near the top thereof, said bimetallic member extending downwardly and laterally into said first chamber to a point below the normal oil level and having a loose connection at its closed end with said inlet valve, an outlet valve in said first chamber, means biasing said outlet valve open, a second bimetallic member connected at one end to said valve body and the other end bearing against said outlet valve to hold it closed against its biasing means, an electrical heater positioned to heat said second bimetallic member to move said other end thereof away from said outlet valve to permit it to open, and a transformer in said second chamber with its secondary coil connected to said electrical terminal members for constantly heating said first member.

2. A constant level oil valve comprising a valve body having first and second chambers therein, an oil inlet valve in said first chamber, means biasing said valve closed, a first substantially U-shaped bimetallic member secured to an adjustable arm on said valve body near the top thereof, said bimetallic member extending downwardly and laterally into said first chamber to a point below the normal oil level and having a connection at its closed end with said inlet valve, an outlet valve in said first chamber, means biasing said outlet valve open, a second bimetallic member adjustably connected at one end to said valve body and the other end bearing against said outlet valve to hold it closed against its biasing means, an electrical heater positioned to heat said second bimetallic member to move said other end thereof away from said outlet valve to permit it to open, and a transformer in said second chamber with its secondary coil connected to said open end of said first member for constantly passing current therethrough.

3. In a constant level oil valve having a valve body with first and second chambers therein, the combination comprising an oil inlet valve in said first chamber, a substantially U-shaped bimetallic member secured by electrical terminal members to an adjustable arm on said valve body near the top thereof, said bimetallic member extending downwardly and laterally into said first chamber to a point below the normal oil level and having a connection at its closed end with said inlet valve, an outlet valve in said first chamber, a bimetallic arm connected at one end to said valve body and the other end connected to said outlet valve, an electrical heater positioned to heat said bimetallic arm to move said other end thereof to open said outlet valve, and a transformer in said second chamber with its secondary coil connected to said electrical terminal members.

4. In a constant level valve, the combination comprising a valve body having a chamber therein, an oil inlet valve in said chamber, means biasing said valve closed, a first substantially U-shaped bimetallic member secured to an adjustable arm on said valve body near the top thereof, said bimetallic member extending downwardly and laterally into said first chamber to a point below the normal oil level and having a connection at its closed end with said inlet valve, an outlet valve in said chamber, means biasing said outlet valve open, a second bimetallic member connected at one end to said valve body and the other end bearing against said outlet valve to hold it closed against its biasing means, an electrical heater positioned to heat said second bimetallic member to move said other end thereof away from said outlet valve to permit it to open, and means connected to the open end of said first member for constantly passing electricity therethrough.

5. A constant level oil valve comprising a valve body having first and second chambers therein and oil inlet valve in said first chamber, means biasing said valve closed, a substantially U-shaped bimetallic member secured by electrical terminal members to an adjustable arm on said valve body near the top thereof, said bimetallic member extending downwardly and laterally into said first chamber to a point below the normal oil level and having a loose connection at its closed end with said inlet valve, an outlet valve in said first chamber, means biasing said outlet valve open, a transformer in said second chamber with its secondary coil connected to said electrical terminal members, a bimetallic arm pivoted at one end to said valve body and the other end bearing against said outlet valve to hold it closed against its biasing means, an electrical heater positioned to heat said bimetallic arm to move said other end thereof away from said outlet valve to permit it to open, and adjustable stop means for limiting the pivotal movement of said bimetallic arm.

6. A liquid level control device comprising a chamber having an inlet valve for controlling liquid flow to said chamber, means normally biasing said valve to its closed position, a generally U-shaped bimetallic member connected to said valve at the closed end of said member, said member extending upwardly and laterally from said closed end at a point below the normal liquid level to a point above the normal liquid level in said chamber, a stiff resilient arm connected at one end to said valve body and connected at the other end thereof to the open end of said bimetallic member by insulated electric terminals, adjustment means for said resilient arm for adjusting said arm and member to vary the valve closing bias of said member on said valve, said member when constantly heated by electric current passing therethrough being operable to open said valve when the liquid level is such as to cause the member to heat up and to close when the liquid level is such as to dissipate the heat generated in said member.

7. A liquid level control device comprising a chamber having an inlet valve for controlling liquid flow to said chamber, means normally biasing said valve to its closed position, a bimetallic member having one end thereof connected to said valve at a point below the normal liquid level in said chamber, said member extending upwardly and laterally from said closed end to a point above the normal liquid level in said chamber, a stiff resilient arm connected at one end to said valve body and connected at the other end thereof to one end of said bimetallic member, adjustment means for said resilient arm for adjusting said arm and member to vary the valve closing bias of said member on said valve, said member when constantly heated by electric current passing therethrough being operable to open said valve when the liquid level is such as to cause the member to heat up and to close when the liquid level is such as to dissipate the heat generated in said member.

8. In a liquid level control device, the combination comprising a chamber having an inlet valve for controlling liquid flow to said chamber, a bimetallic member connected to said valve for actuating the same, said member extending upwardly and laterally from a point below to a point above the normal liquid level in said chamber, an arm connected at one end to said valve body and at the other end thereof to said bimetallic member, adjustment means for said arm for adjusting said arm and member to vary the valve closing bias of said member on said valve, and means for continuously heating said member sufficiently to open said valve when the liquid level is such as to cause the member to heat up and to close said valve when the liquid level is such as to dissipate the heat in said member.

9. A liquid level control device comprising a chamber having an inlet valve for controlling liquid flow to said chamber, a bimetallic member connected to said valve at one end of said member, said member being positioned at the normal liquid level in said chamber with the other end thereof being fixedly supported, said member being positioned to have varying surface contact with said liquid as the liquid level thereof varies and means for conducting electric current to said member at a constant rate so that electric current passing through said member operates to open said valve when the liquid level is such as to cause the member to heat up and to close when the liquid level is such as to dissipate the heat in said member.

10. A liquid level control device comprising a chamber having an inlet valve for controlling liquid flow to said chamber, a bimetallic member anchored at one end and connected to said valve at the other end thereof, said member being positioned substantially at the normal liquid level in said chamber and arranged to be variably bathed by the liquid as the liquid level changes, and mean for conducting electricity to said member constantly for continuously heating the said member so that said member will operate to open said valve when the liquid level is such as to cause the member to heat up and to close when the liquid level is such as to dissipate the heat supplied to said member.

References Cited in the file of this patent

UNITED STATES PATENTS

| Number | Name | Date |
|---|---|---|
| 2,118,443 | McCorkle | May 24, 1938 |
| 2,143,277 | McCorkle | Jan. 10, 1939 |
| 2,211,301 | Taylor | Aug. 13, 1940 |
| 2,274,145 | Johnson | Feb. 24, 1942 |
| 2,409,112 | Dillman | Oct. 8, 1946 |
| 2,526,069 | Douglas | Oct. 17, 1950 |